July 23, 1929.  T. R. HARRISON  1,721,556
MEASURING SUPERHEAT
Filed Feb. 15, 1927
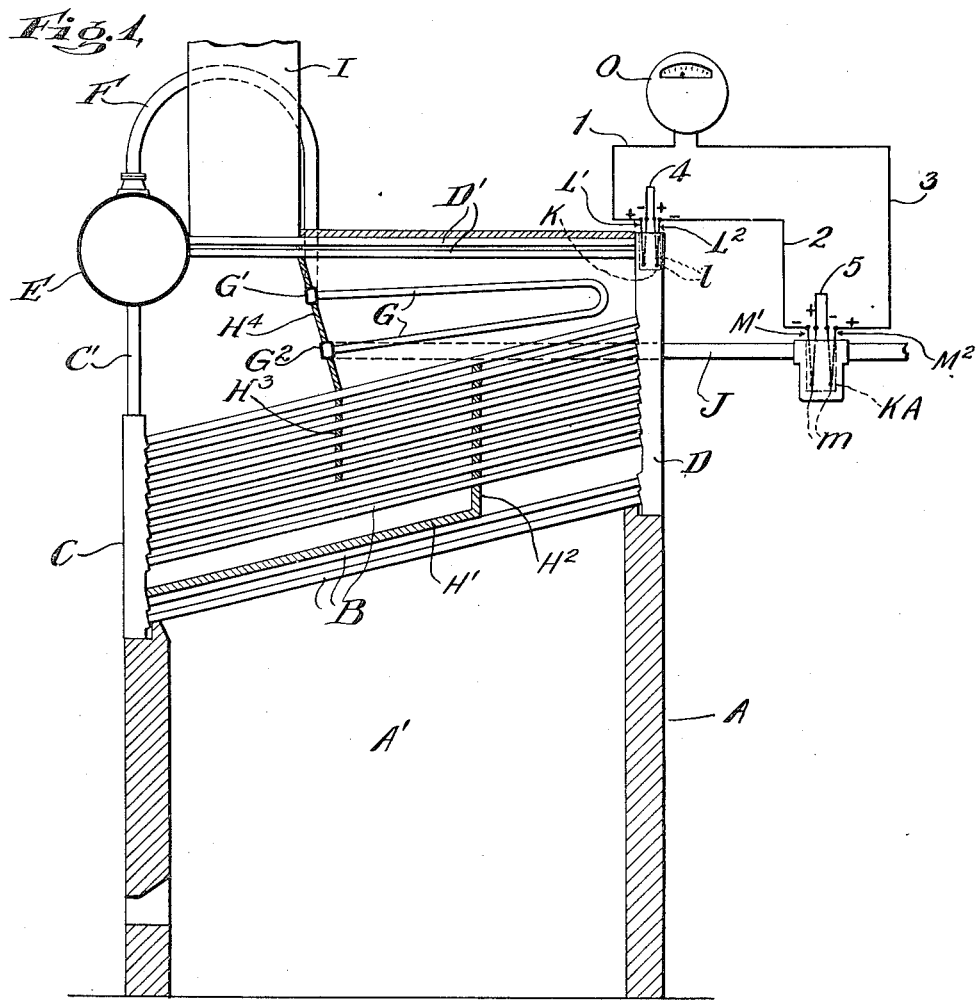
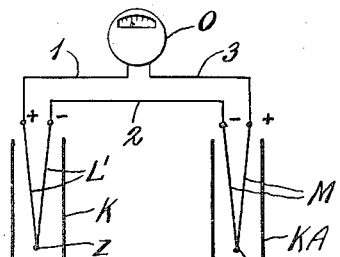
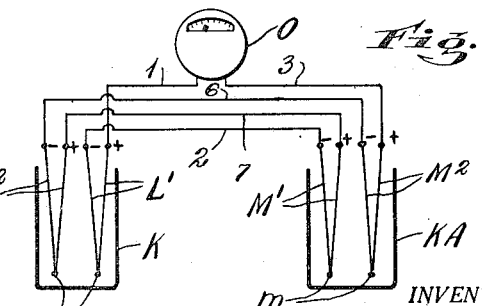
INVENTOR.
THOMAS R. HARRISON
BY J. E. Hubbell
ATTORNEY Patented July 23, 1929.

1,721,556

UNITED STATES PATENT OFFICE.

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

MEASURING SUPERHEAT.

Application filed February 15, 1927. Serial No. 168,445.

The object of the present invention is to provide simple and effective means for measuring the degree of superheat of a vapor, and particularly the superheat of steam, and the invention is characterized by the conjoint use of one or more thermocouples subjected to the temperature of the liquid from which the superheated vapor is formed, one or more other thermocouples subjected to the temperature of the superheated vapor or steam, and a suitable measuring instrument, all so connected that the electromotive force impressed upon the instrument is proportional to the difference between the temperature of the liquid and the temperature of the superheated vapor.

To this end the thermo-couples responsive to the liquid temperature are arranged so that their electro-motive force bucks or opposes the electro-motive force developed by the thermo-couples responsive to the temperature of the superheated vapor. In consequence, the electro-motive force impressed upon the instrument is the difference between the electro-motive forces developed by the two thermo-couples or two sets of thermo-couples, and the galvanometer or other instrument connected in circuit with the thermo-couples may thus give readings which are directly proportional to the degree of superheat of the vapor, and are independent of the actual temperature of the liquid or the superheated vapor.

Because of the simplicity and practicability of the apparatus required, and because the readings obtained are uneffected by any error which might be made in measuring the actual temperature of the liquid or vapor, the invention is well adapted for use in the direct measurement of the superheat in steam supplied by ordinary superheater boilers.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:

Fig. 1 is a diagrammatic representation of a superheater boiler of conventional type, and associated thermo-electric provisions for measuring the degree of superheat imparted to the steam passing through the superheater of the boiler;

Fig. 2 is a diagrammatic view illustrating a modified form of the thermo-electric provisions; and Fig. 3 is a diagrammatic view illustrating a second modification of the thermo-electric provisions shown in Fig. 1.

The boiler A shown in the drawings comprises a combustion chamber A' from which the burning gases and products of combustion pass over the boiler water tubes B to the heating gas outlet or smoke stack connection I. As shown, the boiler is of the so-called horizontal water tube, cross drum type, the inclined water tubes B being connected at their lower ends to headers C, and at their upper ends to headers D. The steam and water drum is located above the headers C, and is connected to the latter by the usual vertical nipples C'. At or about the water level, the drum E is connected by horizontal circulator tubes D' to the upper ends of the headers D. $H'$, $H^2$, $H^3$ and $H^4$ represent baffles providing an elongated path of flow for the heating gases over the boiler tubes. The steam pipe F leads from the top of the steam and water drum to the inlet header G' of a superheater comprising an outlet header $G^2$ located below the inlet header G', and U-tubes G through which the steam passes from the header G' into the header $G^2$ and in which the steam is superheated. As shown, the headers G' and $G^2$ are incorporated in the baffle wall $H^4$ and the tubes G are swept by the heating gases after the latter leave the upper end of the gas passage at the right of the baffle $H^2$ and before those gases enter the gas passage between the baffles $H^2$ and $H^3$. J represents the superheated steam pipe leading from the outlet port of the superheater header $G^2$ to the place of use.

In the form of my invention shown in the drawing, the degree of superheat attained by the steam passing through the superheater is measured by an electric measuring instrument O which may be a sensitive galvanometer or a millivolt meter, and which is connected by circuit conductors 1, 2, and 3 in series with one or more thermo-couples responsive to the boiler water temperature, and with one or more other thermo-couples responsive to the temperature attained by the superheated steam. As shown, there are two thermo-couples L′ and L² responsive to the boiler water temperature, and two thermo-couples M′ and M² responsive to the temperature of the superheated steam. As shown, the thermo-couples L′ and L² are located in a corresponding well K like an ordinary thermometer well. The two wells K receiving the thermo-couples L′ and L² are shown as extending into one of the headers D through the upper end wall of the latter. The hot junction $l$ of each of the thermo-couples L′ and L² is located near the bottom of the well K so that its temperature will be that of the fluid passing upward through the corresponding circulator tubes D′. Similarly the hot junction $m$ of each of the thermo-couples M′ and M² is located near the bottom of the corresponding well KA which extends into an enlargement of the superheated steam outlet pipe J.

The various thermo-couples are connected in series with the instrument O so that electro-motive forces of the thermo-couples L′ and L² act in the same direction in the circuit and oppose the electro-motive force generated by each of the thermo-couples M′ and M². This result is obtained as shown by connecting the negative terminal of the thermo-couple L′ to the positive terminal of the thermo-couple L² through a conductor 4, and by connecting the negative terminal of the thermo-couple L² through the conductor 2 to the negative terminal of the thermo-couple M′ to the negative terminal of the thermo-couple M² through a conductor 5. The positive terminal of the thermo-couple L′ is connected to one terminal of the instrument O by the conductor 1, and the positive terminal of the thermo-couple M² is connected to the second terminal of the instrument O by the conductor 3. Conductors 1 and 3 should be thermo-electrically the same as, or thermo-electrically interchangeable with the positive elements of the thermo-couples L′ and M². Conductor 2 should likewise be thermo-electrically the same as, or thermo-electrically interchangeable with the negative elements of thermo-couples L² and M′.

Connected in the manner described, the net electro-motive force impressed upon the instrument O is equal to the difference between the sum of the electro-motive forces of the thermo-couples L′ and L² and the sum of the electro-motive forces of the thermo-couples M′ and M². The net electro-motive force impressed upon the instrument O is therefore a function of the degree of superheat, and is independent of the actual temperature of either the water or the superheated steam. Within the normal range of operation the net electro-motive force impressed on the instrument O will be in almost linear proportion with the degree of superheat and the instrument O can therefore be directly graduated in degrees of superheat if provisions are made for eliminating error resulting from variations in temperature of the ends of the conductors 4 and 5.

Those skilled in the art will understand that if one of the thermo-couples of each set, shown in Fig. 1, for example the thermo-couples L² and M², were omitted as in the arrangement shown in Fig. 2, the extent of deflection of the instrument O obtained for a given degree of superheat would be decreased. Conversely, by increasing the number of thermo-couples in each set, increased deflections of the instrument O may be secured without changing the ratio of the deflections obtained with different degrees of superheat. Those skilled in the art will also understand, of course, that the invention is not limited to use in the type of boiler illustrated, and that the water temperature responsive thermo-couples L′ and L² may be inserted in any convenient portion of the boiler in which the boiler water temperature is maintained.

Those skilled in the art will also understand that it is ordinarily desirable to provide so-called cold junction temperature compensating provisions to make the operation of the apparatus independent of the actual temperatures of the colder ends of the various thermo-couple elements, and thereby to permit the exhibiting instrument O to be calibrated directly in superheat degree units. With the simple arrangement shown in Fig. 2, this result is secured by the simple expedient of making the conductors 1 and 3 thermo-electrically the same as, or thermo-electrically interchangeable with the positive elements of the thermo-couples L′ and M′, and making the conductor 2 thermo-electrically the same as, or thermo-electrically interchangeable with the negative elements of those thermo-couples.

Connected as described, the differential thermo-couple arrangement shown in Fig. 2 is the thermo-electric equivalent of a simple thermo-couple having its cold junction, $l$, subjected to the boiler steam temperature, and having its hot junction, $m$, subjected to the superheated steam temperature, and the instrument O can be calibrated directly in steam superheat degree units.

The same result can be secured with a multiple differential thermo-couple as shown in Fig. 3, wherein the negative terminals of the thermo-couples L² and M² are connected by a conductor 6, the positive terminals of thermo-couples L² and M′ are connected by a conductor 7, the negative terminals of the thermo-couples L′ and M′ are connected by a conductor 2, the positive terminal of the thermo-couple L′ is connected by conductor 1 to one terminal of the instrument O, and the second terminal of the instrument is connected by the conductor 3 to the positive terminal of the thermo-couple $M^2$. If the thermo-couples are all alike, and the various conductors are thermo-electrically interchangeable with the thermo-couple element materials, for example, if the thermo-couples are platinum, platium-rhodium couples and the conductors 1, 3 and 7 are copper, and the conductors 2 and 6 are of a suitable copper-nickel alloys, the arrangement shown in Fig. 3 is thermo-electrically equivalent to a circuit including two simple thermo-couples connected in series and each having its hot junction at the temperature of the superheated steam and its cold junction at the boiler steam and water temperature.

Having now described my invention, what I claim as new and desire to secure by Letters Patent, is:—

1. Apparatus for measuring the degree of superheat obtained in a superheater boiler comprising one or more thermo-couples subjected to the boiler water temperature, one or more thermo-couples subjected to the temperature of the superheated steam leaving the boiler, and an electric measuring circuit including an electrical measuring instrument so connected in series with said thermo-couples that the electro-motive force developed by the first mentioned thermo-couple or thermo-couples opposes the electro-motive force developed by the second mentioned thermo-couple or thermo-couples.

2. The combination with apparatus for superheating a vapor, of one or more thermo-couples subjected to the temperature of the vapor before it is acted on by said apparatus, one or more thermo-couples subjected to the temperature of the vapor after it is acted on by said apparatus, and an electric measuring circuit including a voltmeter so connected in series with said thermo-couples that the electromotive force developed by the first mentioned thermo-couple or thermo-couples opposes the electro-motive force developed by the second mentioned thermo-couple or thermo-couples.

3. Apparatus for measuring the degree of superheat obtained in a superheater boiler comprising one or more thermo-couples subjected to the boiler water temperature, one or more thermo-couples subjected to the superheated steam temperature, a meter and means connecting said thermo-couples in series with said meter comprising conductors connected to the different thermo-couple terminals each of a material thermoelectrically interchangeable with the thermo-couple element or elements to which it is directly connected.

4. Apparatus for measuring the degree of superheat obtained in a superheater boiler comprising one or more thermo-couples subjected to the boiler water temperature, one or more thermo-couples subjected to the superheated steam temperature, a meter and means so connecting said thermo-couples in series with one another and said meter that each thermo-couple subjected to the superheated steam temperature acts like the hot junction, and each thermo-couple subjected to the boiler water temperature acts like the cold junction of a simple thermo-couple having its hot and cold junctions subjected, respectively, to the superheated steam, and boiler water temperatures.

Signed at Philadelphia, in the county of Philadelphia, and State of Pennsylvania, this 11th day of February, A. D. 1927.

THOMAS R. HARRISON.